US011539505B2

(12) United States Patent
Onoda

(10) Patent No.: US 11,539,505 B2
(45) Date of Patent: *Dec. 27, 2022

(54) ENCRYPTING DATA

(71) Applicant: KYNDRYL, INC., New York, NY (US)

(72) Inventor: Yasuhiro Onoda, Kanagawa (JP)

(73) Assignee: KYNDRYL, INC., New York, NY (US)

(*) Notice: Subject to any disclaimer, the term of this patent is extended or adjusted under 35 U.S.C. 154(b) by 697 days.

This patent is subject to a terminal disclaimer.

(21) Appl. No.: 16/443,079

(22) Filed: Jun. 17, 2019

(65) Prior Publication Data

US 2019/0305929 A1  Oct. 3, 2019

Related U.S. Application Data

(63) Continuation of application No. 15/412,459, filed on Jan. 23, 2017, now Pat. No. 10,396,977, which is a (Continued)

(30) Foreign Application Priority Data

Mar. 29, 2012  (JP) .............................. JP2012-077904

(51) Int. Cl.
*H04L 9/00* (2022.01)
*H04L 9/06* (2006.01)

(52) U.S. Cl.
CPC .......... *H04L 9/0618* (2013.01); *H04L 9/0637* (2013.01)

(58) Field of Classification Search
CPC ...................... H04L 9/0618; H04L 9/0637
See application file for complete search history.

(56) References Cited

U.S. PATENT DOCUMENTS 5,438,622 A  8/1995 Normile et al.
5,444,781 A  8/1995 Lynn et al.
(Continued)

FOREIGN PATENT DOCUMENTS

CN  1643841  7/2005
CN  101682502  3/2010
(Continued)

OTHER PUBLICATIONS

Swain, G., & Lenka, S. K. (2011). A robust image steganography technique using dynamic embedding with two least significant bits. In Advanced Materials Research (vol. 403, pp. 835-841). Trans Tech Publications Ltd. (Year: 2011).*

(Continued)

*Primary Examiner* — Jeffrey Nickerson
*Assistant Examiner* — Syed M Ahsan
(74) *Attorney, Agent, or Firm* — John Kennel; Hunter E. Webb; Keohane & D'Alessandro, PLLC

(57) ABSTRACT

A method and system. An instruction to encrypt plaintext to generate encrypted data from the plaintext is received. The encrypted data is to be stored in a database device in response to a first request received from a client terminal to store the plaintext in the database device. The first request includes the plaintext. Ciphertext is generated by applying both an initialization vector and an encryption key directly to the plaintext. An embedding rule used to generate the encrypted data is selected from a sequence of embedding rules. The encrypted data is stored in the database device, A second request to receive the plaintext data is received from the client terminal. The plaintext is obtained from the encrypted data, by separating the encrypted data into the ciphertext and the initialization vector; and generating the plaintext by decrypting the ciphertext that was separated from the encrypted data.

18 Claims, 7 Drawing Sheets

Related U.S. Application Data continuation of application No. 15/078,311, filed on Mar. 23, 2016, now Pat. No. 9,634,827, which is a continuation of application No. 14/735,292, filed on Jun. 10, 2015, now Pat. No. 9,344,274, which is a continuation of application No. 13/760,194, filed on Feb. 6, 2013, now Pat. No. 9,143,326.

(56) References Cited

U.S. PATENT DOCUMENTS

| | | | |
|---|---|---|---|
| 5,768,390 | A | 6/1998 | Coppersmith et al. |
| 8,358,781 | B2 * | 1/2013 | Schneider ............. H04L 9/0637 |
| | | | 380/46 |
| 9,143,326 | B2 | 9/2015 | Onoda |
| 9,344,274 | B2 | 5/2016 | Onoda |
| 9,634,827 | B2 | 4/2017 | Onoda |
| 2004/0042620 | A1 | 3/2004 | Andrews et al. |
| 2007/0011344 | A1 | 1/2007 | Paka et al. |
| 2007/0038873 | A1 | 2/2007 | Oliveira et al. |
| 2007/0073422 | A1 | 3/2007 | Gaikwad et al. |
| 2007/0237327 | A1 * | 10/2007 | Taylor ...................... H04L 9/14 |
| | | | 380/37 |
| 2009/0161874 | A1 | 6/2009 | Eun et al. |
| 2010/0067687 | A1 | 3/2010 | Chandramouli et al. |
| 2010/0135486 | A1 | 6/2010 | Schneider |
| 2010/0174897 | A1 | 7/2010 | Schumacher |
| 2013/0259225 | A1 | 10/2013 | Onoda |
| 2015/0312032 | A1 | 10/2015 | Onoda |
| 2016/0204932 | A1 | 7/2016 | Onoda |

FOREIGN PATENT DOCUMENTS

| | | |
|---|---|---|
| CN | 101753292 | 6/2010 |
| JP | 5249891 | 9/1993 |
| JP | 7058961 | 6/1995 |
| JP | 7273756 | 10/1995 |
| JP | 2546504 | 10/1996 |
| JP | 2000252973 | 9/2000 |
| JP | 2002108205 | 4/2002 |
| JP | 2003110842 | 4/2003 |
| JP | 3442010 | 9/2003 |
| JP | 2006318589 | 11/2006 |
| JP | 2007134860 | 5/2007 |
| JP | 2007311936 | 11/2007 |
| JP | 2008011181 | 1/2008 |
| JP | 2008124987 | 5/2008 |
| JP | 4172131 | 10/2008 |
| JP | 4466641 | 5/2010 |
| JP | 2010231778 | 10/2010 |
| JP | 20102066751 | 11/2010 |
| JP | 2011114594 | 6/2011 |
| WO | 9937052 | 7/1999 |
| WO | 2007038509 | 4/2007 |

OTHER PUBLICATIONS

Swain G, Lenka SK. A robust image steganography technique using dynamic embedding with two least significant bits. InAdvanced Materials Research 2012 (vol. 403, pp. 835-841). Trans Tech Publications Ltd. (Year: 2012).*

Anonymous; A Program to Securely and Effectively Encrypt Multiple Plain Text with One Initialization Vector IPCOM000208119D; ip.com; Jun. 24, 2011; 2 pages.

Office Action (dated Aug. 18, 2014) for U.S. Appl. No. 13/760,194, filed Feb. 6, 2013, Conf. No. 2206.

Amendment (dated Nov. 17, 2014) for U.S. Appl. No. 13/760,194, filed Feb. 6, 2013, Conf. No. 2206.

Final Office Action (dated Mar. 3, 2015) for U.S. Appl. No. 13/760,194, filed Feb. 6, 2013, Conf. No. 2206.

Final amendment (dated Apr. 23, 2015) for U.S. Appl. No. 13/760,194, filed Feb. 6, 2013, Conf. No. 2206.

Notice of Allowance (dated May 18, 2015) for U.S. Appl. No. 13/760,194, filed Feb. 6, 2013, Conf. No. 2206.

Office Action (dated Nov. 3, 2015) for U.S. Appl. No. 14/735,292, filed Jun. 10, 2015, Conf. No. 6651.

Amendment (dated Jan. 25, 2016) for U.S. Appl. No. 14/735,292, filed Jun. 10, 2015, Conf. No 6651.

Notice of Allowance (dated Feb. 25, 2016) for U.S. Appl. No. 14/735,292, filed Jun. 10, 2015, Conf. No. 6651.

Office Action (dated May 4, 2016) for U.S. Appl. No. 15/078,311, filed Mar. 23, 2016.

Amendment (dated Aug. 1, 2016) for U.S. Appl. No. 15/078,311, filed Mar. 23, 2016.

Final Office Action (dated Aug. 29, 2016) for U.S. Appl. No. 15/078,311, filed Mar. 23, 2016.

Final amendment (dated Oct. 28, 2016) for U.S. Appl. No. 15/078,311, filed Mar. 23, 2016.

Notice of Allowance (dated Dec. 7, 2016) for U.S. Appl. No. 15/078,311, filed Mar. 23, 2016.

Office Action (dated Jul. 26, 2017) for U.S. Appl. No. 15/412,459, filed Jan. 23, 2017.

Amendment (dated Oct. 23, 2017) for U.S. Appl. No. 15/412,459, filed Jan. 23, 2017.

Encryption, Wikipedia, retreived from Internet on Oct. 23, 2017, <URL: https://en.wikipedia.org/wiki/Encryption >, 4 pages.

Final Office Action (dated Dec. 8, 2017) for U.S. Appl. No. 15/412,459, filed Jan. 23, 2017.

Final Amendment (dated Feb. 8, 2018) for U.S. Appl. No. 15/412,459, filed Jan. 23, 2017.

Advisory action (dated Mar. 28, 2018) for U.S. Appl. No. 15/412,459, filed Jan. 23, 2017.

RCE (dated Apr. 27, 2018) for U.S. Appl. No. 15/412,459, filed Jan. 23, 2017.

Office Action (dated Sep. 20, 2018) for U.S. Appl. No. 15/412,459, filed Jan. 23, 2017.

Amendment (dated Dec. 20, 2018) for U.S. Appl. No. 15/412,459, filed Jan. 23, 2017.

Notice of allowance (dated Apr. 15, 2019) for U.S. Appl. No. 15/412,459, filed Jan. 23, 2017.

\* cited by examiner

ENCRYPTING DATA

This application is a continuation application claiming priority to Ser. No. 15/412,459, filed Jan. 23, 2017, now U.S. Pat. No. 10,396,977, issued Aug. 27, 2019, which is a continuation application of Ser. No. 15/078,311, filed Mar. 23, 2016, U.S. Pat. No. 9,634,827, issued Apr. 25, 2017, which is a continuation of Ser. No. 14/735,292, filed Jun. 10, 2015, U.S. Pat. No. 9,344,274, issued May 17, 2016, which is a continuation of Ser. No. 13/760,194, filed Feb. 6, 2013, U.S. Pat. No. 9,143,326, issued Sep. 22, 2015.

TECHNICAL FIELD

The present invention relates generally to a device, system, and method for encrypting data. More specifically, the present invention relates to a device, system, and method for encrypting data using a block encryption scheme in which data is encrypted in each block.

BACKGROUND

Data encryption is performed by encrypting plaintext to obtain unintelligible ciphertext. For example, encryption may be performed using as input an encryption key and an initialization vector in addition to the plaintext. However, current encryption schemes do not adequately manage the initialization vector.

BRIEF SUMMARY

The present invention provides a method for encrypting data, said method comprising:
generating, by a processor of a computer system, an initialization vector;
said processor generating ciphertext from plaintext by applying the initialization vector and an encryption key to the plaintext; and
said processor combining the initialization vector with the ciphertext to generate encrypted data, by using an embedding rule to perform said combining.

The present invention provides a computer program product, comprising a computer readable storage device having computer readable program code stored therein, said program code containing instructions which, upon being executed by a processor of a computer system, implement a method for encrypting data, said method comprising:
said processor generating an initialization vector;
said processor generating ciphertext from plaintext by applying the initialization vector and an encryption key to the plaintext; and
said processor combining the initialization vector with the ciphertext to generate encrypted data, by using an embedding rule to perform said combining.

The present invention provides a computer system comprising a processor, a memory coupled to the processor, and a computer readable storage device coupled to the processor, said storage device containing program code which, upon being executed by the processor via the memory, implements a method for encrypting data, said method comprising:
said processor generating an initialization vector;
said processor generating ciphertext from plaintext by applying the initialization vector and an encryption key to the plaintext; and
said processor combining the initialization vector with the ciphertext to generate encrypted data, by using an embedding rule to perform said combining.

DETAILED DESCRIPTION

Figure 1:
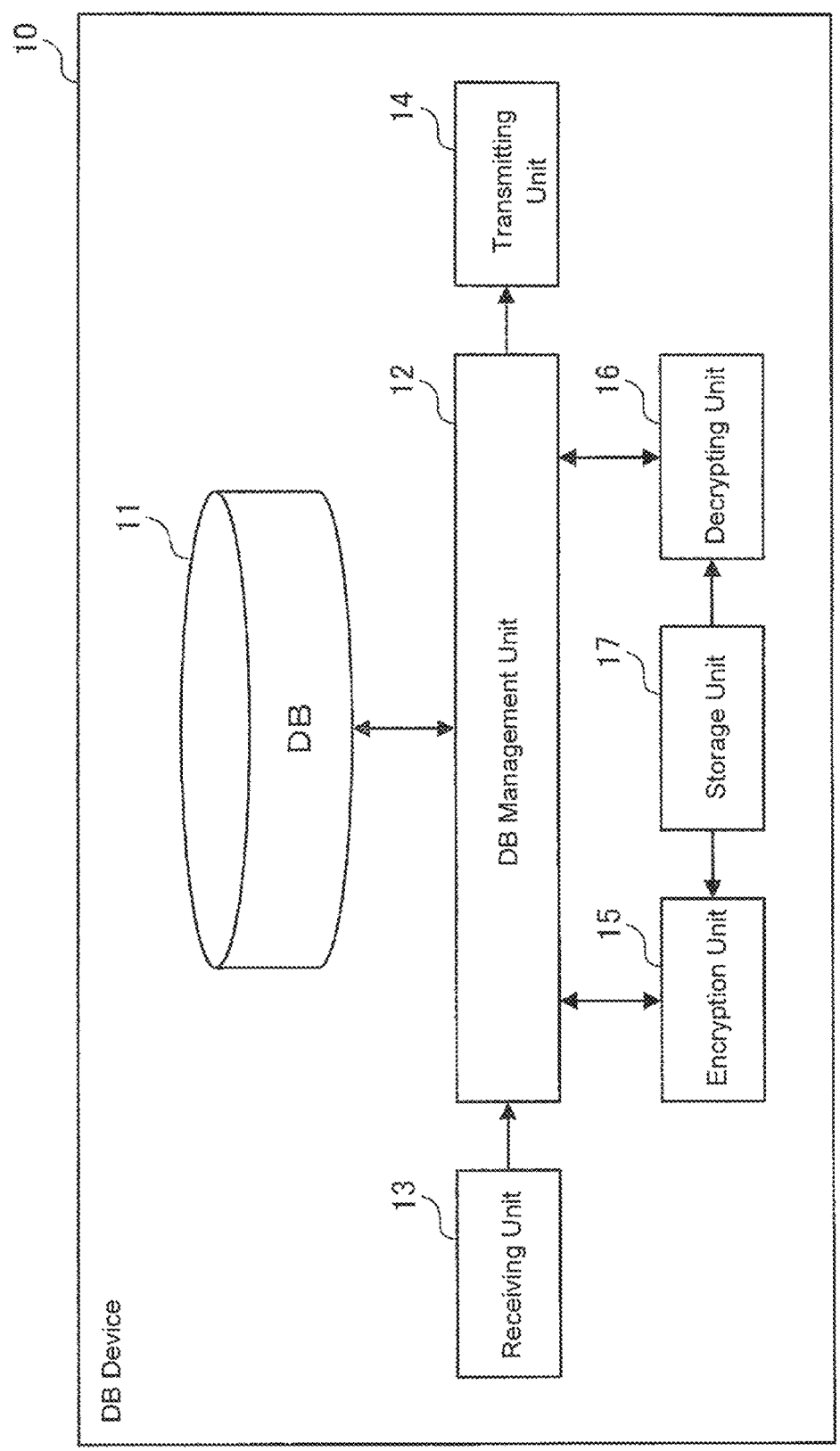
FIG. 1 is a block diagram showing an example of a configuration for a database device in an embodiment of the present invention.

A purpose of the present invention is to allow, in a block encryption scheme for encrypting data in each block, an initialization vector (IV) to be applied to each data set without adversely affecting confidentiality or increasing the administrative burden. Another purpose of the present invention is to eliminate, n a block encryption scheme for encrypting data in each block, the need for special management means to manage initialization vectors.

In order to achieve these purposes, the present invention provides a device for encrypting data using a block encryption scheme for encrypting data in each block, in which the device includes: a first acquiring unit for acquiring first data, the first data being data to be encrypted; a second acquiring unit for acquiring an encryption key used in the block encryption scheme; a first generating unit for generating an initialization vector used in the block encryption scheme; a second generating unit for generating second data by encrypting the first data acquired by the first acquiring unit with the block encryption scheme using the encryption key acquired by the second acquiring unit and the initialization vector generated by the first generating unit; and an embedding unit for embedding the initialization vector generated by the first generating unit in the second data generated by the second generating unit according to an embedding rule. Here, the first acquiring unit in the device may also include: a determining unit for determining an embedding rule each time first data is acquired; and a storage unit for storing a correspondence relationship between first data acquired by the first acquiring unit, and either an embedding rule determined by the determining unit or a determination method for the embedding rule. In this situation, the determining unit may determine an embedding rule for a portion of second data other than a predetermined portion on the basis of the predetermined portion of the second data generated by the second gene unit. Also, the embedding unit in this device may include: a third acquiring unit for acquiring third data generated by the embedding unit having embedded the initialization vector in the second data; a separating unit for separating the third data acquired by the third acquiring unit into the initialization vector and the second data according to an embedding rule; and a decryption unit for restoring the first data by decrypting the second data obtained by the separating unit using the encryption key separated and acquired by the second acquiring unit, and the initialization vector separated and acquired by the separating unit.

The present invention also provides a device for maintaining a database for storing data encrypted using a block encryption scheme for encrypting data in each block, in which the device includes: a storage unit for storing an encryption key used by the block encryption scheme; a receiving unit for receiving first data from a storage-requesting device requesting storage of first data in the database; a first generating unit for generating an initialization vector used by the block encryption scheme; a second generating unit for generating second data by encrypting the first data received by the receiving unit with the block encryption scheme using the encryption key stored in the storage unit, and the initialization vector generated by the first generating unit; a third generating unit for generating third data by embedding according to an embedding rule the initialization vector generated by the first generating unit in the second data generated by the second generating unit; a housing unit for storing in the database the third data generated by the third generating unit; an acquiring unit for acquiring the third data from the database in accordance with a retrieval request from a retrieval-requesting device requesting retrieval of the first data from the database; a separating unit for separating the third data acquired by the acquiring unit into the initialization vector and the second data according to the embedding rule; a restoring unit for restoring the first data by decrypting the second data separated and acquired by the separating unit using the encryption key stored in the storage unit and the initialization vector separated and acquired by the separating unit; and a transmitting unit for transmitting the first data restored by the restoring unit to the retrieval-requesting device.

The preset invention also provides a method for encrypting data using a block encryption scheme for encrypting data in each block, in which the method includes the steps of: acquiring first data, the first data being data to be encrypted; acquiring an encryption key used in the block encryption scheme; generating an initialization vector used in the block encryption scheme; generating second data by encrypting the first data with the block encryption scheme using the encryption key and the initialization vector; and embedding the initialization vector in the second data according to an embedding rule.

The present invention also provides a program enabling a computer to function as a device for encrypting data using a block encryption scheme for encrypting data in each block, in which the program enables the computer to function as: a first acquiring unit for acquiring first data, the first data being data to be encrypted; a second acquiring unit for acquiring an encryption key used in the block encryption scheme; a first generating unit for generating an initialization vector used in the block encryption scheme; a second generating unit for generating second data by encrypting the first data acquired by the first acquiring unit with the block encryption scheme using the encryption key acquired by the second acquiring unit and the initialization vector generated by the first generating unit; and an embedding unit for embedding the initialization vector generated by the first generating unit in the second data generated by the second generating unit according to an embedding rule.

The present invention also provides a program enabling a computer to function as a device for decrypting data using a block encryption scheme for encrypting data in each block, in which the program enables the computer to function as: an acquiring unit for acquiring third data generated by embedding according to an embedding rule an initialization vector in second data generated by encrypting first data with the block encryption scheme using an encryption key and the initialization vector; a separating unit for separating the third data acquired by the acquiring unit into the initialization vector and the second data according to the embedding rule; and a restoring unit for restoring the first data by decrypting the second data separated and acquired by the separating unit using the encryption key and the initialization vector separated and acquired by the separating unit.

The present invention enables, in a block encryption scheme for encrypting data in each block, an initialization vector to be applied to each data set without adversely affecting confidentiality or increasing the administrative burden.

FIG. 1 is a block diagram showing an example of a configuration for a database (DB) device 10 in an embodiment of the present invention. As shown in the drawing, the DB device 10 includes a DB 11, a DB management unit 12, a receiving unit 13, a transmitting unit 14, an encryption unit 15, a decrypting unit 16, and a storage unit 17. The storage unit 17 is a hardware storage device such as, inter alia, the magnetic disk device 90g depicted in FIG. 7.

The DB 11 is a collection of data shared by a plurality of client terminals (not shown) connected, for example, via a network to the DB device 10. The data is stored, for example, in a plurality of tables in a relational database.

The DB management unit 12 stores data in the tables of the DB 11, retrieves data from the tables of the DB 11, instructs the encryption unit 15 to encrypt data, instructs the decryption unit 16 to decrypt encrypted data, and performs other processes. More specially, when the receiving unit 13 receives a request to store data in a table of the DB 11, the receiving unit 13 determines whether or not the data to be encrypted is included in the data received by the receiving unit 13 along with the storage request. In the case of data to be encrypted, the encryption unit 15 is instructed to encrypt the data, encrypted data is acquired, and the encrypted data is stored along with data not requiring encryption in the DB 11. Also, when the receiving unit 13 receives a request to retrieve data from a table of the DB 11, the DB 11 is searched using key information (information which is a search key able to uniquely identify data) received by the receiving unit 13 along with the retrieval request, and it is determined whether or not encrypted data is included in the retrieved data. In the case of encrypted data, the decryption unit 16 is instructed to decrypt the data, decrypted data is acquired, and the decrypted data is outputted along with data that has not been encrypted to the transmitting unit 14. In this embodiment, the DB management unit 12 is provided as an example of a storage unit for storing data in a database.

The receiving unit 13 receives a request to store data in a table of the DB 11 from a client terminal (not shown) serving as an example of a storage-requesting device, and the storage request is passed along with the data to the DB management unit 12. The receiving unit 13 also receives a request to retrieve data from a table of the DB 11 from a client terminal (not shown) serving as an example of a retrieval-requesting device, and the retrieval request is passed along with key information to the DB management unit 12.

The transmitting unit 14 receives from the DB management unit 12 data retrieved from the DB 11 (including data decrypted by the decryption unit 16), and this data is sent to the client terminal (not shown) serving as an example of a retrieval-requesting device.

The encryption unit 15 receives data to be encrypted from the DB management unit 12. This data is encrypted with a block encryption scheme using an encryption key and an initialization vector, and the encryption results are returned to the DB management unit 12. In one embodiment, the block encryption method used here can be the Advanced Encryption Standard (AES) or the Data Encryption Standard (DES).

The decryption unit 16 receives encrypted data from the DB management unit 12. This data is decrypted using the decryption scheme corresponding to the block encryption scheme of the encryption unit 15 using the same encryption key and initialization vector used by the encryption unit 15, and the original unencrypted data is returned to the DB management unit 12.

The storage unit 17 stores the encryption keys used by the encryption unit 15 to encrypt data and by the decryption unit 16 to decrypt data. In this embodiment, the encryption key storage area in the storage unit 17 serves as an example of a storage unit for storing encryption keys.

These function units are realized by software and hardware resources working in tandem. More specifically, these function units are realized by the CPU, which reads the program (for realizing the DB management unit 12, the receiving unit 13, the transmitting unit 14, the encryption unit 15, and the decryption unit 16) from, for example, a magnetic disk device to the main memory, and then executes the program. More specifically, the DB management unit 12 is utilized by, for example, executing a database management system (DBMS) program. The encryption unit 15 is executed, for example, by executing a program for an encryption function corresponding to a specific block encryption scheme, and the decryption unit 16 is executed, for example, by executing a program for a decryption function corresponding to the specific block encryption scheme used by the encryption unit 15. Here, the encryption function and the decryption function provided by the DBMS can be used. Also, the DB 11 and storage unit 17 can be realized, for example, using a magnetic disk device.

A computer program product of the present invention comprises a computer readable storage device having computer readable program code stored therein. The program code contains instructions which, upon being executed by a processor (e.g., a CPU) of a computer system, implement methods of the present invention, including methods for encrypting data and for decrypting data.

A computer system of the present invention comprises a processor, a memory coupled to the processor, and a computer readable storage device coupled to the processor. The storage device contains program code which, upon being executed by the processor via the memory, implements methods of the present invention, including methods for encrypting data and for decrypting data.

Figure 2:
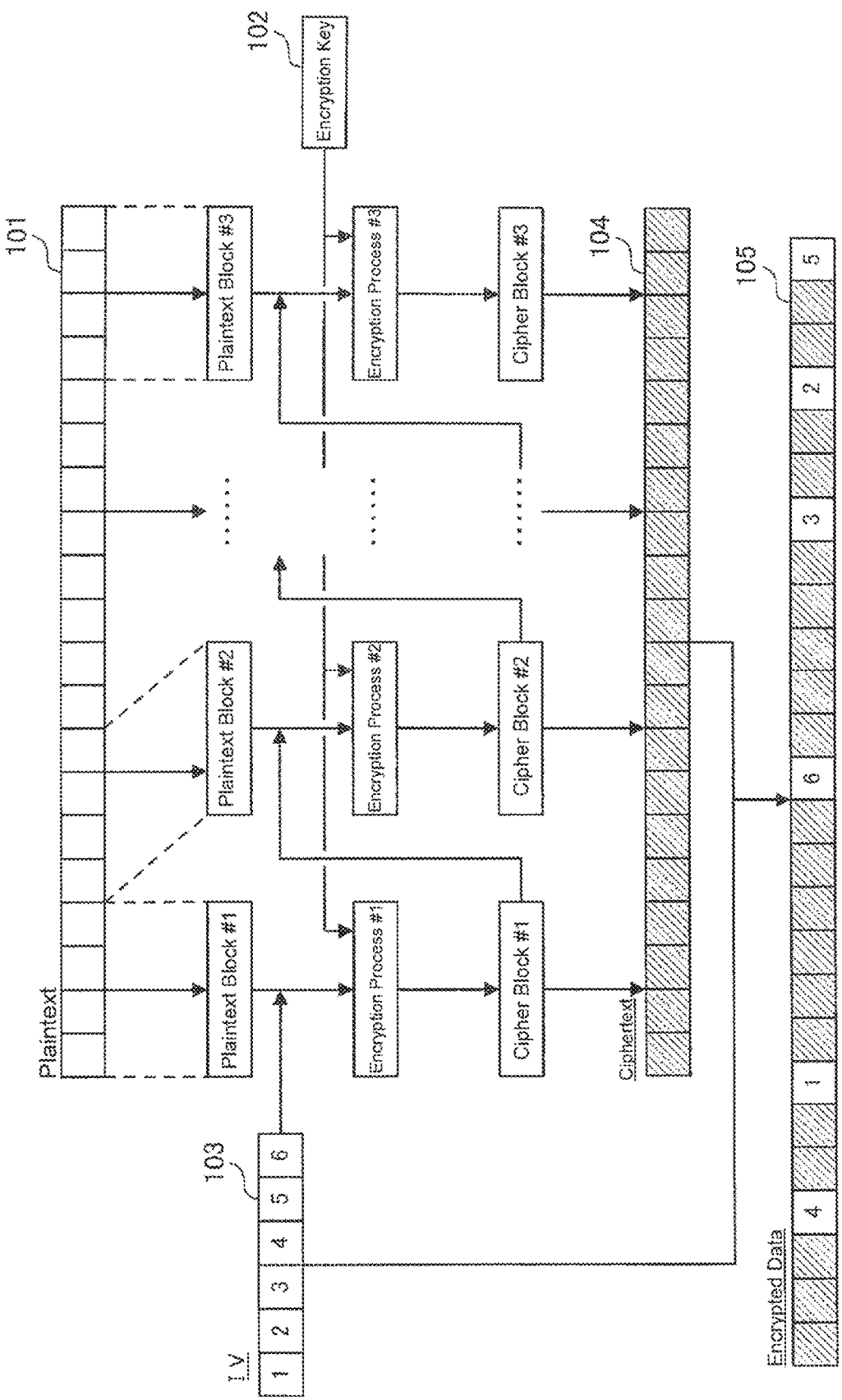
FIG. 2 is a diagram showing an overview of the process for embedding an IV in ciphertext in an embodiment of the present invention.

In this embodiment, a DB device 10 with this configuration does not manage the initialization vectors (e.g., pseudo-random numbers) generated for each row of a table separately from the ciphertext, but embeds them in the ciphertext. FIG. 2 is a diagram showing an overview of the process for embedding these initialization vectors in ciphertext. As shown in the drawing, plaintext 101 is first divided into blocks, and plaintext blocks #1, #2, . . . , #n are generated. Next, plaintext block #1 is encrypted using encryption key 102 and initialization vector 103 in encryption process #1 to obtain cipher block #1. Plaintext block #2 is encrypted using encryption key 102 and cipher block #1 in encryption process #2 to obtain cipher block #2. Similarly, each subsequent plaintext block is encrypted using encryption key 102 and the previous cipher block to obtain a cipher block. Cipher blocks #1, #2, . . . , #n are synthesized, and ciphertext 104 is generated. In this embodiment, ciphertext 104 is not returned without further modification as the encryption results. Instead, for example, the initialization vector 103 is combined with the ciphertext 104 according to an embedding rule to generate the resulting encrypted data 105 which is returned.

The preceding process of generating the ciphertext 104 depicted in FIG. 2 is summarized as follow s. The plaintext 101 is divided into N plaintext blocks denoted as $B_1, \ldots, B_N$, wherein N is an integer of at least 2. Block $B_1$ is encrypted using the encryption key 102 and the initialization vector 103 to generate cypher block $C_1$. Block $B_n$ is encrypted using the encryption key 102 and block $B_{n-1}$ to generate cypher block $C_n$ (n=2, . . . , N). Cypher blocks $C_1, \ldots, C_N$ are combined (e.g., concatenated) to generate the ciphertext 104.

While not shown in the drawing, when this encrypted data 105 is decrypted, the encrypted data 105 is first divided in accordance with the embedding rule used during encryption into initialization vector 103 and the ciphertext 104 which is the original encryption result. The ciphertext 104 is then decrypted using the encryption key 102 and the initialization vector 103 in a decryption scheme corresponding to the block encryption scheme used during encryption.

Figure 3:
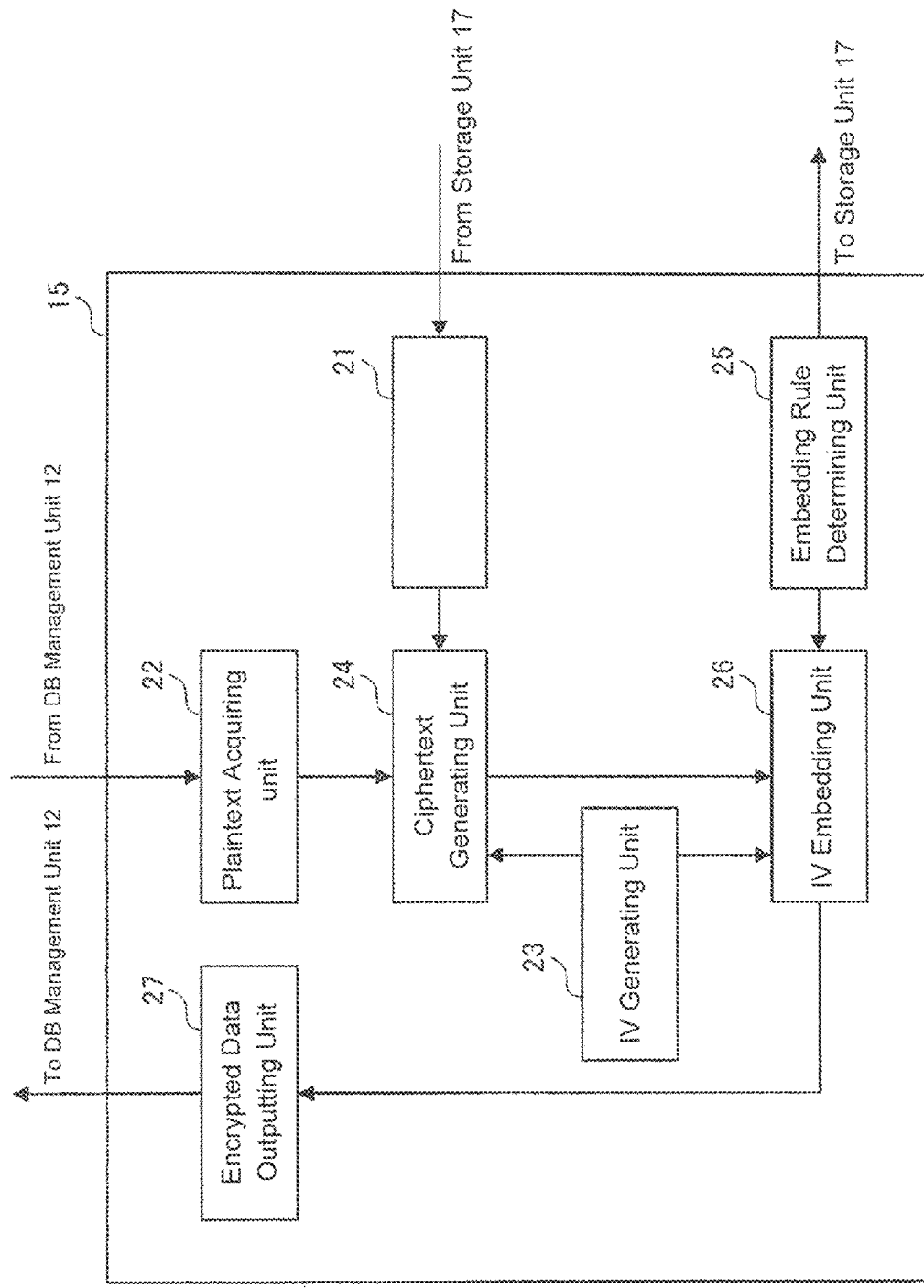
FIG. 3 is a diagram showing an example of the functional structure of an encryption unit in an embodiment of the present invention.

The following is a detailed explanation of the functional unit in the DB base 10 which perform these operations. The configuration and operations of the encryption unit 15 used to encrypt data will be explained first. FIG. 3 is a diagram showing an example of the functional structure of the encryption unit 15 in this embodiment of the present invention. As shown in the drawing, the encryption unit 15 includes an encryption key acquiring unit 21, a plaintext acquiring unit 22, an IV generating unit 23, ciphertext generating unit 24, an embedding rule determining unit 25, an IV embedding unit 26, and an encrypted data outputting unit 27.

The encryption key acquiring unit 21 acquires the encryption key used in the encryption process from the storage unit 17 (see FIG. 1). In this embodiment, the encryption key acquiring unit 21 serves as an example of a second acquiring unit for acquiring the encryption key used in the encryption process.

The plaintext acquiring unit 22 acquires the plaintext, or the data to be encrypted which is stored in a table of DB 11 (see FIG. 1), from the DB management unit 12 (see FIG. 1). In this embodiment, the plaintext serves as an example of first data, which is the data to be encrypted, and the plaintext acquiring unit 22 serves as an example of a first acquiring unit for acquiring first data.

In one embodiment, the IV generating unit 23 generates an initialization vector (e.g., by generating a pseudo-random number). In this embodiment, the IV generating unit 23 serves as an example of a first generating unit for generating an initialization vector.

The ciphertext generating unit 24 generates ciphertext by encrypting the plaintext acquired by the plaintext acquiring unit 22 using the encryption key acquired by the encryption key acquiring unit 21 and the initialization vector generated by the IV generating unit 23. In this embodiment, the ciphertext serves as an example of second data, and the ciphertext generating unit 24 serves as an example of a second generating unit for generating second data.

The embedding rule determining unit 25 determines the embedding rule when the initialization vector is to be embedded in the ciphertext, associates key information in the data to be encrypted with the embedding rule, and stores the association in the storage area for embedding rules in the storage unit 17 (see FIG. 1). Embedding rules and the method for determining these rules will be described below. In this embodiment, the embedding rule determining unit 25 serves as an example of a determining unit for determining embedding rules, and the storage area for embedding rules in the storage unit 17 serves as an example of a storage unit for storing a correspondence relationship between first data and embedding rules.

The IV embedding unit 26 generates encrypted data by embedding the initialization vector generated by the IV generating unit 23 in the ciphertext generated by the ciphertext generating unit 24 in accordance with the embedding rule determined by the embedding rule determining unit 25. In this embodiment, the IV embedding unit 26 serves as an example of an embedding unit for embedding an initialization vector in second data. Also, the encrypted data serves as an example of third data, and the IV embedding unit 26 serves as an example of a third generating unit for generating third data.

The encrypted data output unit 27 outputs the encrypted data generated by the IV embedding unit 26 to the DB management unit 12 (see FIG. 1).

Figure 4:
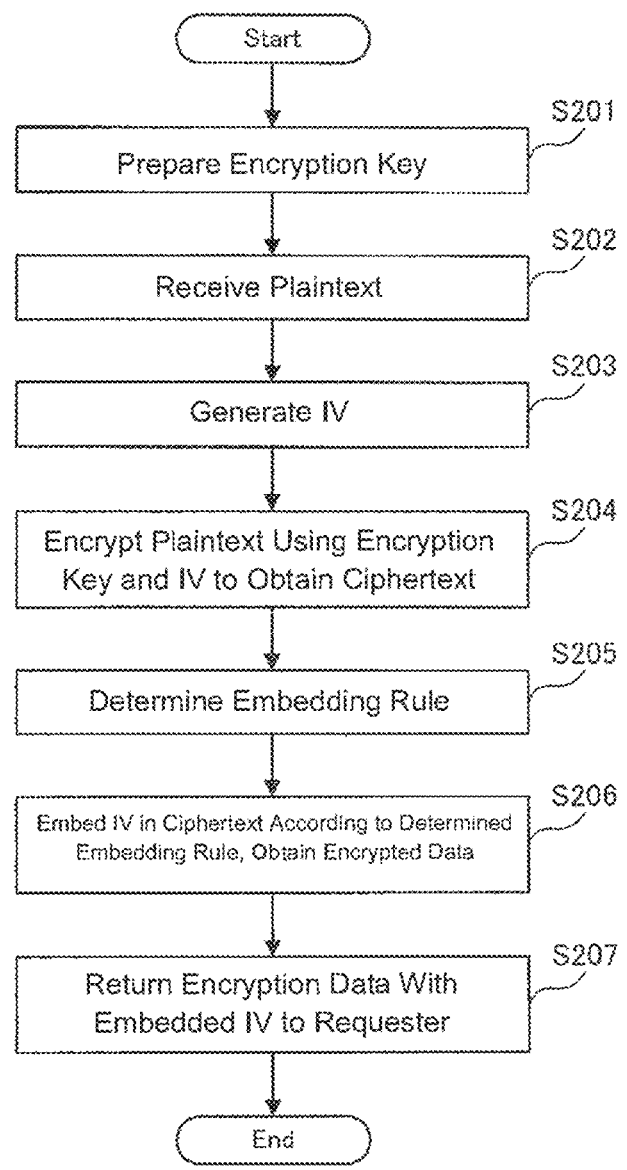
FIG. 4 is a flowchart showing an example of operations performed by an encryption unit in an embodiment of the present invention.

FIG. 4 is a flowchart showing an example of operations performed by the encryption unit 15 in the embodiment of the present invention. The operations in this flowchart start, for example, when an encryption function corresponding to a specific block encryption scheme is called up from the DB storage unit 12. When the operations have been started, as shown in FIG. 4, the encryption key acquiring unit 21 in the encryption unit 15 first acquires an encryption key 102 stored in the storage unit 17 (Step 201). Also, the plaintext acquiring unit 22 acquires plaintext 101 from the DB management unit 12 (Step 202). In addition in one embodiment, the IV generating unit 23 may generate a pseudorandom number to serve as an initialization vector 103 (Step 203). When the encryption key, plaintext and initialization vector obtained in Steps 201-203, the ciphertext generating unit 24 generates ciphertext 104 by encrypting the plaintext with a specific block encryption scheme using the encryption key and initialization vector (Step 204). Then, the embedding rule determining unit 25 determines the embedding rule for embedding the initialization vector in the ciphertext (Step 205). Here, the embedding rule determining unit 25 associates key information in the plaintext with the embedding rule, and stores the association in the storage unit 17. The embedding rule and method for determining these rules will be explained in greater detail below. Then, the IV embedding unit 26 generates encrypted data 105 by embedding the initialization vector generated in Step 203 in the ciphertext generated in Step 204 in accordance with the embedding rule determined in Step 205. Finally, the encrypted data output unit 27 outputs the encrypted data 105 generated in Step 206 to the DB management unit 12 (see FIG. 1) (Step 207). The encrypted data 105 is stored in a hardware storage device such as storage unit 17.

Figure 5:
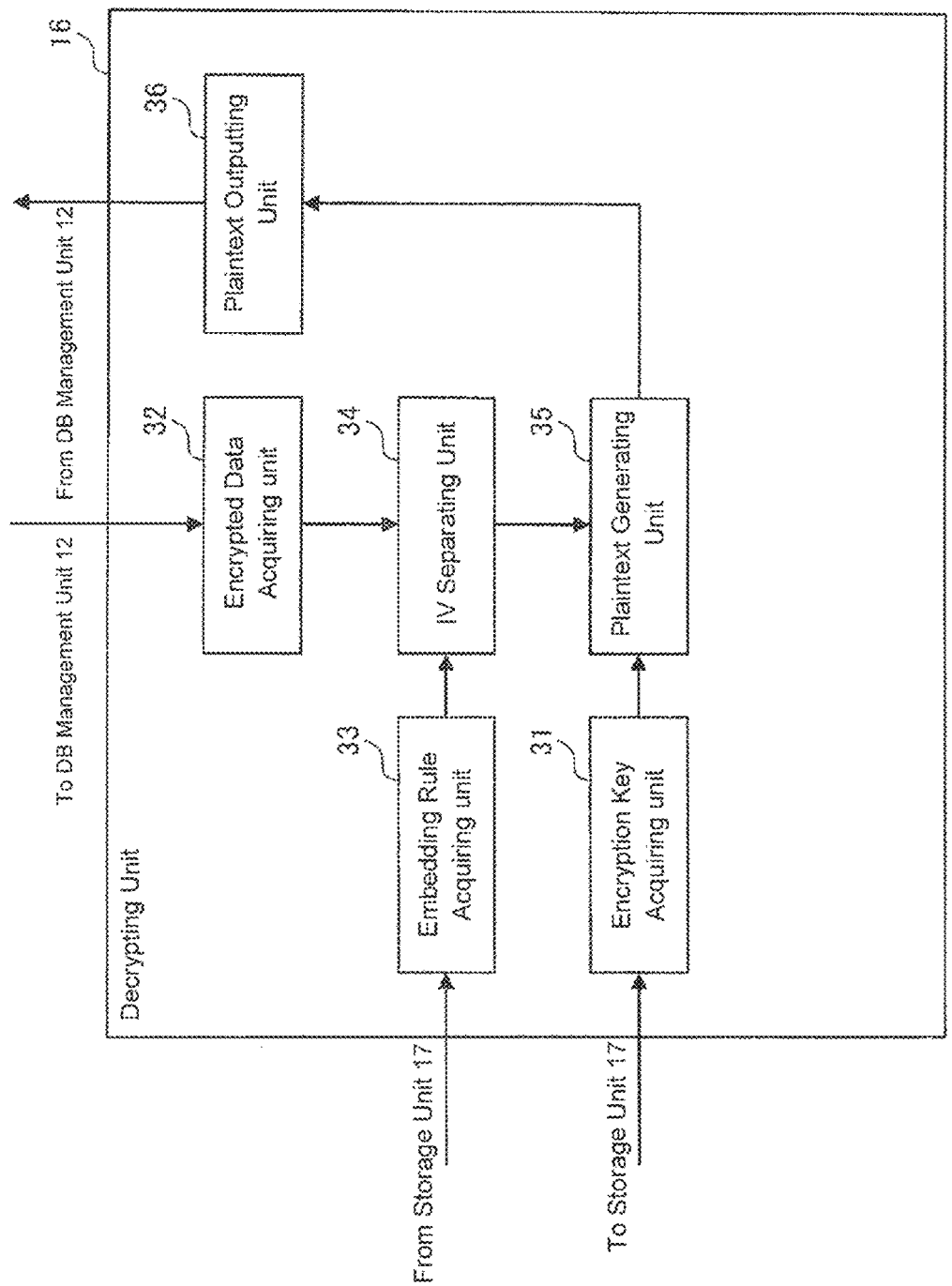
FIG. 5 is a diagram showing an example of the functional structure of a decryption unit in an embodiment of the present invention.

The following is an explanation of the configuration and operations of the decrypting unit 16 for decrypting the encrypted data. FIG. 5 is a diagram showing an example of the functional structure of the decryption unit 16 in the embodiment of the present invention. As shown in the drawing, the decryption unit 16 includes an encryption key acquiring unit 31, an encrypted data acquiring unit 32, an embedding rule acquiring unit 33, an IV separating unit 34, a plaintext generating unit 35, and a plaintext outputting unit 36.

The encryption key acquiring unit 31 acquires the encryption key used in the decryption process from the storage unit 17 (see FIG. 1). In this embodiment, the encryption key acquiring unit 31 serves as an example of the second acquiring unit for acquiring the encryption key used in the decryption process The encrypted data acquiring unit 32 acquires the encrypted data, which is data retrieved from a table in the DB 11 (see FIG. 1) from the DB management unit 12 (see FIG. 1). In this embodiment, the encrypted data acquiring unit 32 serves as a third acquiring unit for acquiring third data, or an acquiring unit for acquiring third data.

The embedding rule acquiring unit 33 acquires from the storage area, for embedding rules in the storage unit 17 (see FIG. 1), the embedding rule used by the IV embedding unit 26 to embed the initialization vector in the cipher text by retrieving key information passed on by the DB management unit 12.

The IV separating unit 34 separates the encrypted data acquired by the encrypted data acquiring unit 32 into the initialization vector and the ciphertext that is the original encryption result in accordance with the embedding rule acquired by the embedding rule acquiring unit 33. In this embodiment, the IV separating unit 34 serves as an example of a separating unit for separating third data into an initialization vector and second data.

The plaintext generating unit 35 generates plaintext by decrypting the ciphertext separated and obtained by the IV separating unit 34 using the encryption key acquired by the encryption key acquiring unit 31 and the initialization vector acquired by the IV separating unit 34. In this embodiment, the plaintext generating unit 35 serves as an example of a restoring unit for restoring first data.

The plaintext outputting unit 36 outputs plaintext generated by the plaintext generating unit 35 to the DB management unit 12 (see FIG. 1).

Figure 6:
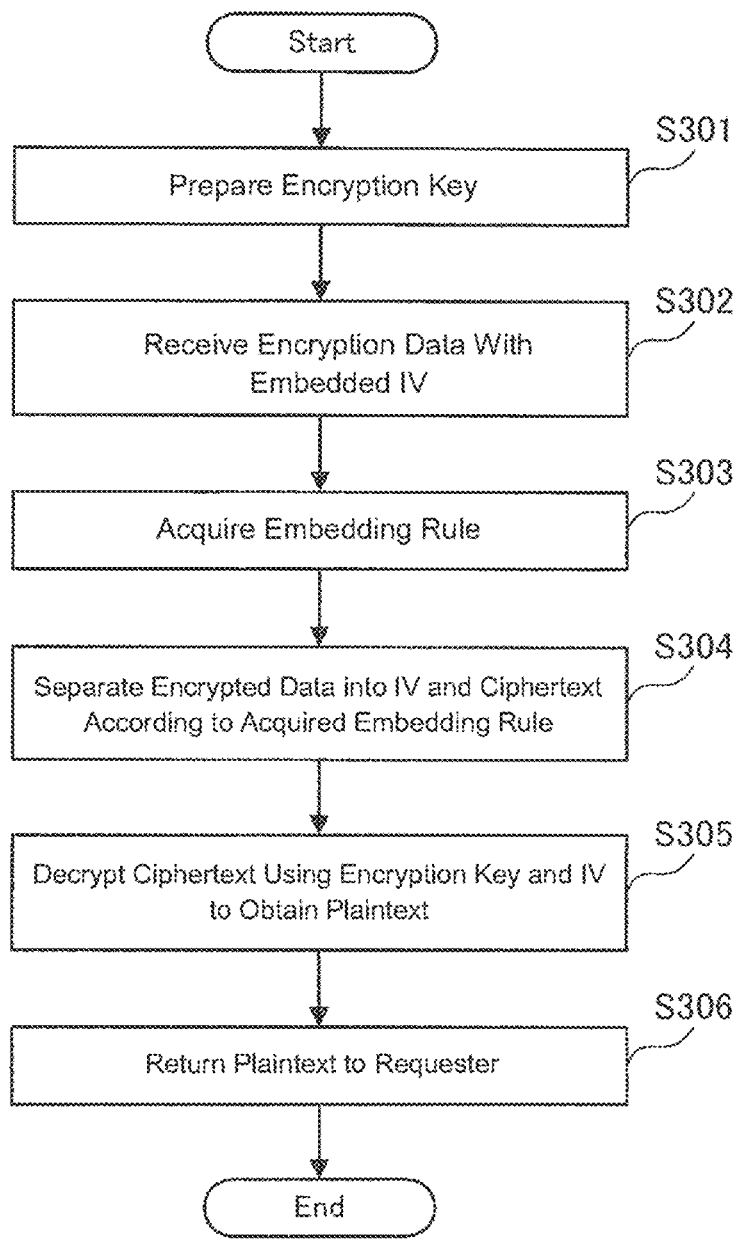
FIG. 6 is a flowchart showing an example of operations performed by a decryption unit in an embodiment of the present invention.

FIG. 6 is a flowchart showing examples of operations performed by the decryption unit 16 in the embodiment of the present invention. The operations in this flowchart are started, for example, when a decryption function corresponding to a specific block encryption scheme is called up from the DB management unit 12. When these operations are started, as shown in the FIG. 6, the encryption key acquiring unit 31 in the decryption unit 16 acquires the encryption key stored in the storage unit 17 (Step 301). Also, the encrypted data acquiring unit 32 acquires encrypted data with an embedded initialization vector from the DB management unit 12 (Step 302). Then, the embedding rule acquiring unit 33 acquires the embedding rule stored in the storage unit 17 associated with key information passed on by the DB management unit 12 serving as the embedding rule used to generate the encrypted data (Step 303). Then, the separating unit 34 separates the encrypted data acquired in Step 302 into the ciphertext that is the original encryption results and the initialization vector in accordance with the embedding rule acquired in Step 303 (Step 304). With the encryption key, initialization vector and ciphertext from Steps 301-304, the plaintext generating unit 35 generates plaintext by decrypting the encrypted text with the decryption scheme corresponding to a specific block encryption scheme using the encryption key and the initialization vector (Step 305). Finally, the plaintext outputting unit 36 outputs the plaintext generated in Step 305 to the DB management unit 12 (Step 306).

It has not yet been explained how the embedding rules in this embodiment are determined in Step 205 of FIG. 4. Here, for example, the following embedding rules may be considered. The first embedding rule states that the initialization vector be simply attached (i.e., concatenated) to the beginning or end of the ciphertext. The embedding second rule states that the initialization vector be divided by a predetermined (i.e., specified) number of bits to obtain initialization vector fragments, that the ciphertext be divided by a predetermined number of bits to obtain ciphertext fragments, and that the initialization vector fragments be inserted between ciphertext fragments in the same order as in the initialization vector. The third rule states that the initialization vector is divided at random positions to obtain initialization vector fragments of different lengths, that the ciphertext be divided at random positions to obtain ciphertext fragments of different lengths, and that the initialization vector fragments be inserted between the ciphertext fragments in an order unrelated to their order in the initialization vector.

These rules are for illustrative purposes only. Many other rules may be considered. For example, a variation of the second rule and the third rule may be considered which states that the initialization vector not be divided, that the ciphertext be divided in two to obtain two ciphertext fragments, and that the initialization vector be inserted between the two ciphertext fragments. In other words, the second rule and the third rule can be generalized to state that the ciphertext be divided to obtain ciphertext fragments, and that the initialization vector or fragments of the initialization vector be inserted between ciphertext fragments. Herein, such insertions between fragments are referred to as "embedding".

The following methods may be considered, for example, as methods for determining the embedding rule. In the first method, the embedding rule is determined by referencing the ciphertext generated in Step 204 of FIG. 4. For example, a rule can be determined so that the initialization vector (e.g., pseudo-random number) is not embedded in the first few bytes of ciphertext, but embedded based on a value in the first few bytes every time ciphertext is generated. However, the portion of the ciphertext referenced is not limited to the first few bytes. More generally, an embedding rule can be determined for portions of ciphertext other than a specific portion of ciphertext on the basis of the specific portion of ciphertext. In the second method, the embedding rule is determined based on information not obtained from the ciphertext generated in Step 204 of FIG. 4. The information not obtained from the ciphertext be, for example, the date and time of encryption.

Here, it is important that the decrypting unit 16 be able to identify the embedding rule used by the encrypting unit 15. In this embodiment, a single DB device 10 performs both the encryption and decryption, so the embedding rule can be shared confidentially by the encryption side and the decryption side. More specifically, when the encryption unit 15 encrypts data, the embedding rule determining unit 25 determines the embedding rule, associates key information for the data with the embedding rule, and stores the association in the storage area for embedding rules in the storage unit 17. When the decryption unit 16 decrypts the encrypted data, the embedding rule acquiring unit 33 acquires the embedding rule from the storage area in the storage unit 17 based on key information for the data.

However, when the embedding rule can be identified by having the decrypting unit 16 reference the encrypted data as in the first method, the method for determining the embedding rule and not the embedding rule itself is stored in the storage area for embedding rules in the storage area 17. For example, in the method for determining the embedding rule, the first two bits of the ciphertext are referenced. If "00", the first embedding rule was used. If "01", the second embedding rule was used. If "10", the third embedding rule was used. If "11", the fourth embedding rule was used. In this case, information indicating the determination method is associated with key information for the data, and the association is stored in the storage area for embedding rules in the storage unit 17. Here, the storage area for embedding rules in the storage unit 17 serves as an example of a storage unit for storing a correspondence relationship between first data and either an embedding rule or a determination method for the embedding rule.

In the embodiment, as described above, storage of the initialization vector in a portion of the encrypted data is premised on the generation of an initialization vector each time encryption is performed. In this way, different encrypted results can be obtained even when the same plaintext and same encryption key are used, and a special management means is not required to manage initialization vector s. Also, the initialization vector embedding rule cannot be determined in the encryption results. Because the initialization vector cannot be extracted, the initialization vector can be concealed.

Figure 7:
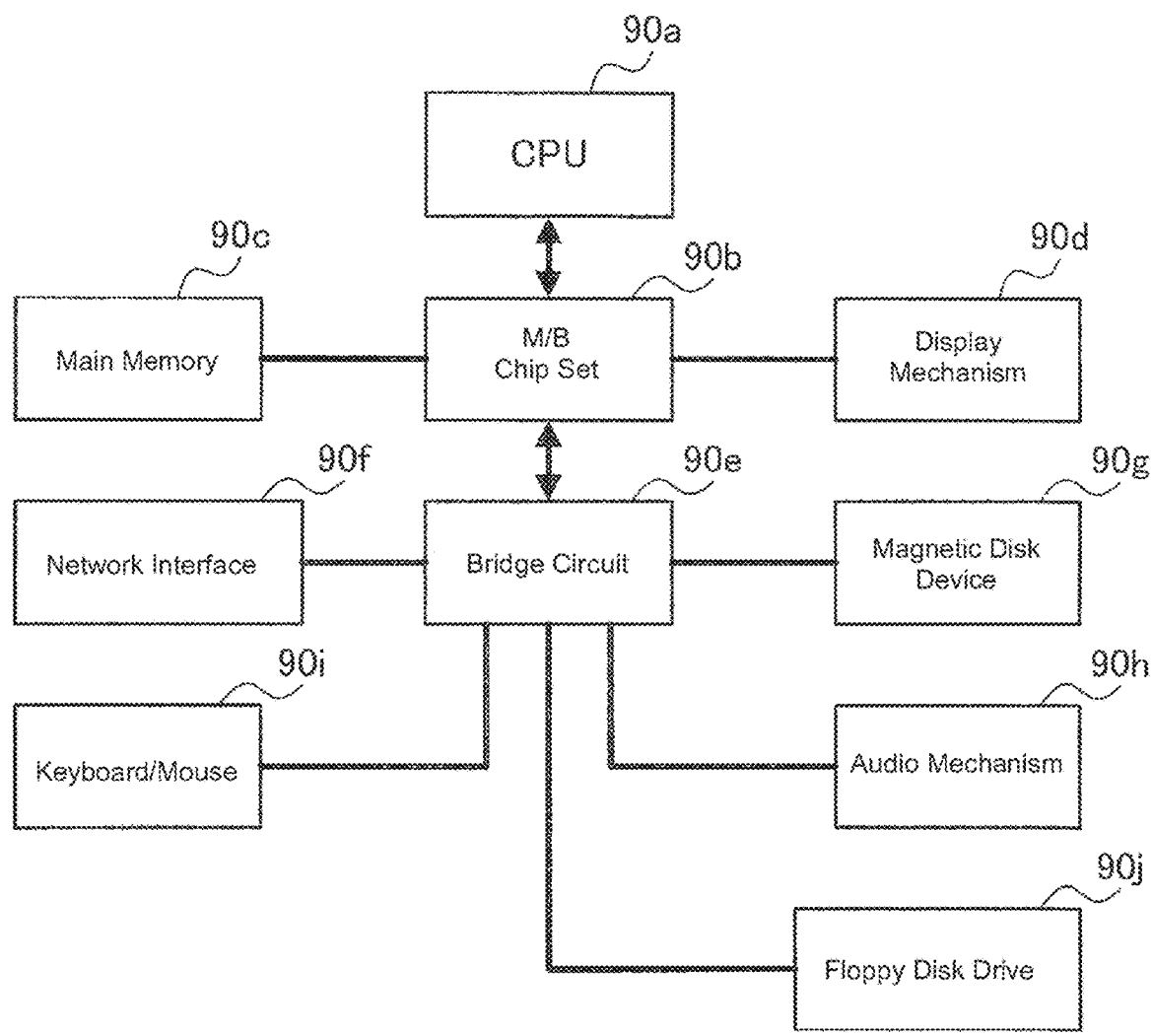
FIG. 7 is a diagram showing an example of the hardware configuration of a computer able to implement an embodiment of the present invention.

Finally, the hardware configuration of a computer able to implement this embodiment will be explained. FIG. 7 is a diagram showing an example of the hardware configuration of a computer or computer system able to implement the embodiment of the present invention. As shown in the drawing, the computer includes a central processing unit (CPU) 90a serving as a computing means, a main memory 90c connected to the CPU 90a via a motherboard (M/B) chip set 90b, and a display means 90d connected to the CPU 90a via the same M/B chip set 90b. A network interface 90f, magnetic disk device (MD) 90g, audio mechanism 90h, keyboard/mouse 90i, and floppy disk drive 90j are also connected to the M/B chip set 90b via a bridge circuit 90e.

In FIG. 7, the various configurational elements are connected via a bus. For example, the CPU 90a and the M/B chip set 90b, and the M/B chip set 90b and the main memory 90c are connected via a CPU bus. Also, the M/B chip set 90b and the display mechanism 90d may be connected via an accelerated graphics port (AGP). However, when the display mechanism 90d includes a PCI express-compatible video card, the M/B chip set 90b and the video card are connected via a PCI express (PCIe) bus. Also, PCI Express can be used as the network interface 90f if, for example, it is connected to the bridge circuit 90e. Examples of magnetic disk drives 90g include a serial AT attachment (ATA), a parallel-transmission ATA, and peripheral components interconnect (PCI). The keyboard/mouse 90i and the floppy disk drive 90j can use a universal serial bus (USB).

Here, the present invention can be realized using all hardware or all software. It can also be realized using a combination of both hardware and software. The present invention can also be realized as a computer, data processing system/computer system, or computer program. The computer program can be stored and distributed on a computer-readable medium. Here, the medium can be electronic, magnetic, optical, mechanical, infrared, or a semiconductor system (device or equipment). Examples of computer-readable media include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disk, and DVDs.

When a computer program of the present invention is provided on a computer-readable medium, a computer program for executing the process in FIG. 4 and the computer program for executing the process in FIG. 6 can be stored in the same medium or in different media.

The present invention was explained above using an embodiment, but the technical scope of the present invention is not limited in any way by this embodiment. It should be clear to a person of skill in the art that various modifications and substitutions can be made without departing from the spirit and scope of the present invention.

What is claimed is:

1. A method, said method comprising:
    generating, by a processor of a computer system, ciphertext by applying both an initialization vector and an encryption key directly to plaintext;
    said processor selecting one embedding rule from a sequence of embedding rules, said selecting the one embedding rule comprising using the first two bits of the ciphertext to select the one embedding rule from the sequence of embedding rules;
    said processor using the selected one embedding rule to combine the initialization vector with the entire ciphertext to generate encrypted data;
    said processor storing the encrypted data in a database device; and
    said processor retrieving the encrypted data, obtaining the plaintext from the encrypted data, and sending the obtained plaintext to a client terminal, wherein said obtaining the plaintext from the encrypted data comprises: separating the encrypted data into the ciphertext and the initialization vector; and after said separating, generating the plaintext by decrypting, using the encryption key and the initialization vector, the ciphertext that was separated from the encrypted data.

2. The method of claim 1, wherein said generating ciphertext comprises:
    dividing the plaintext into N plaintext blocks denoted as $B_1, \ldots, B_N$, wherein N is an integer of at least 2;
    encrypting block $B_1$ using the encryption key and the initialization vector to generate cipher block $C_1$;
    encrypting block $B_n$ using the encryption key and block $B_{n-1}$ to generate cipher block $C_n$ (n=2, ..., N); and
    combining cipher blocks $C_1, \ldots, C_N$ to generate the ciphertext, wherein the generated ciphertext consists of the cipher blocks $C_1 \ldots, C_N$.

3. The method of claim 1, wherein the initialization vector is a pseudo-random number.

4. The method of claim 1, wherein said using the embedding rule comprises generating the encrypted data by attaching the initialization vector to the beginning or end of the ciphertext.

5. The method of claim 1, wherein said using the embedding rule comprises generating the encrypted data by:
    dividing the initialization vector at random positions into initialization vector fragments of different lengths;
    dividing the ciphertext at random positions into ciphertext fragments of different lengths; and
    distributing the initialization vector fragments between the ciphertext fragments according to an order that is unrelated to the order of the initialization vector fragments in the sequence.

6. A computer program product, comprising a computer readable storage device having computer readable program code stored therein, said program code containing instructions which, upon being executed by a processor of a computer system, implement a method, said method comprising:
    said processor generating ciphertext by applying both an initialization vector and an encryption key directly to plaintext;
    said processor selecting one embedding rule from a sequence of embedding rules, said selecting the one embedding rule comprising using the first two bits of the ciphertext to select the one embedding rule from the sequence of embedding rules;
    said processor using the selected one embedding rule to combine the initialization vector with the entire ciphertext to generate encrypted data;
    said processor storing the encrypted data in a database device; and
    said processor retrieving the encrypted data, obtaining the plaintext from the encrypted data, and sending the obtained plaintext to a client terminal, wherein said obtaining the plaintext from the encrypted data comprises: separating the encrypted data into the ciphertext and the initialization vector; and after said separating, generating the plaintext by decrypting, using the encryption key and the initialization vector, the ciphertext that was separated from the encrypted data.

7. The computer program product of claim 6, wherein said generating ciphertext comprises:
    dividing the plaintext into N plaintext blocks denoted as $B_1, \ldots, B_N$, wherein N is an integer of at least 2;
    encrypting block $B_1$ using the encryption key and the initialization vector to generate cipher block $C_1$;
    encrypting block $B_n$ using the encryption key and block $B_{n-1}$ to generate cipher block $C_n$ (n=2, ..., N); and
    combining cipher blocks $C_1, \ldots, C_N$ to generate the ciphertext, wherein the generated ciphertext consists of the cipher blocks $C_1, \ldots, C_N$.

8. The computer program product of claim 6, wherein the initialization vector is a pseudo-random number.

9. The computer program product of claim 6, wherein said using the embedding rule comprises generating the encrypted data by attaching the initialization vector to the beginning or end of the ciphertext.

10. The computer program product of claim 6, wherein said using the embedding rule comprises generating the encrypted data by:
    dividing the initialization vector at random positions into initialization vector fragments of different lengths;
    dividing the ciphertext at random positions into ciphertext fragments of different lengths; and
    distributing the initialization vector fragments between the ciphertext fragments according to an order that is unrelated to the order of the initialization vector fragments in the sequence.

11. A computer system comprising a processor, a memory coupled to the processor, and a computer readable storage device coupled to the processor, said storage device containing program code which, upon being executed by the processor via the memory, implements a method, said method comprising:

said processor generating ciphertext by applying both an initialization vector and an encryption key directly to plaintext;

said processor selecting one embedding rule from a sequence of embedding rules, said selecting the one embedding rule comprising using the first two bits of the ciphertext to select the one embedding rule from the sequence of embedding rules;

said processor using the selected one embedding rule to combine the initialization vector with the entire ciphertext to generate encrypted data;

said processor storing the encrypted data in a database device; and said processor retrieving the encrypted data, obtaining the plaintext from the encrypted data, and sending the obtained plaintext to a client terminal, wherein said obtaining the plaintext from the encrypted data comprises: separating the encrypted data into the ciphertext and the initialization vector; and after said separating, generating the plaintext by decrypting, using the encryption key and the initialization vector, the ciphertext that was separated from the encrypted data.

12. The computer system of claim 11, wherein said generating ciphertext comprises:

dividing the plaintext into N plaintext blocks denoted as $B_1, \ldots, B_N$, wherein N is an integer of at least 2;

encrypting block $B_1$ using the encryption key and the initialization vector to generate cipher block $C_1$;

encrypting block $B_n$ using the encryption key and block $B_{n-1}$ to generate cipher block $C_n$ (n=2, ..., N); and combining cipher blocks $C_1, \ldots, C_N$ to generate the ciphertext, wherein the generated ciphertext consists of the cipher blocks $C_1, \ldots, C_n$t.

13. The computer system of claim 11, wherein the initialization vector is a pseudo-random number.

14. The computer system of claim 11, wherein said using the embedding rule comprises generating the encrypted data by attaching the initialization vector to the beginning or end of the ciphertext.

15. The computer system of claim 11, wherein said using the embedding rule comprises generating the encrypted data by:

dividing the initialization vector at random positions into initialization vector fragments of different lengths;

dividing the ciphertext at random positions into ciphertext fragments of different lengths; and distributing the initialization vector fragments between the ciphertext fragments according to an order that is unrelated to the order of the initialization vector fragments in the sequence.

16. The method of claim 1, wherein the generated encrypted data resulting from said using the selected one embedding rule includes all bits of the initialization vector.

17. The computer program product of claim 6, wherein the generated encrypted data resulting from said using the selected one embedding rule includes all bits of the initialization vector.

18. The computer system of claim 11, wherein the generated encrypted data resulting from said using the selected one embedding rule includes all bits of the initialization vector.

* * * * *